Figure 5:
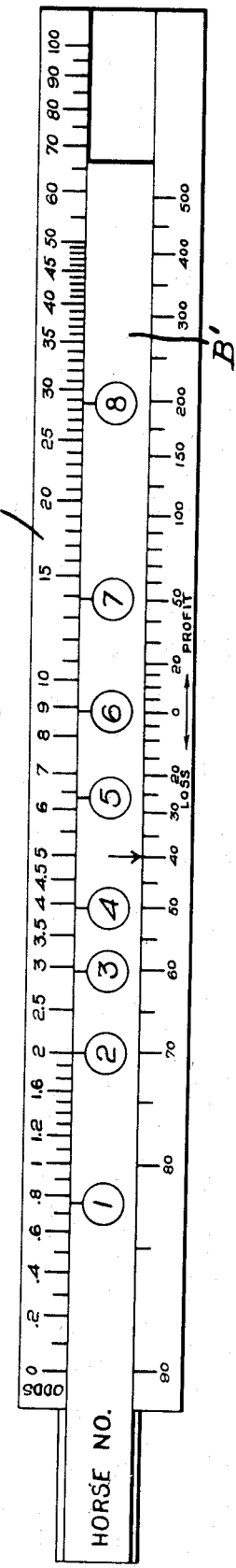

Jan. 15, 1946. A. F. PYM 2,392,877
CALCULATING OR INDICATING DEVICE
Filed Sept. 30, 1939 3 Sheets-Sheet 1
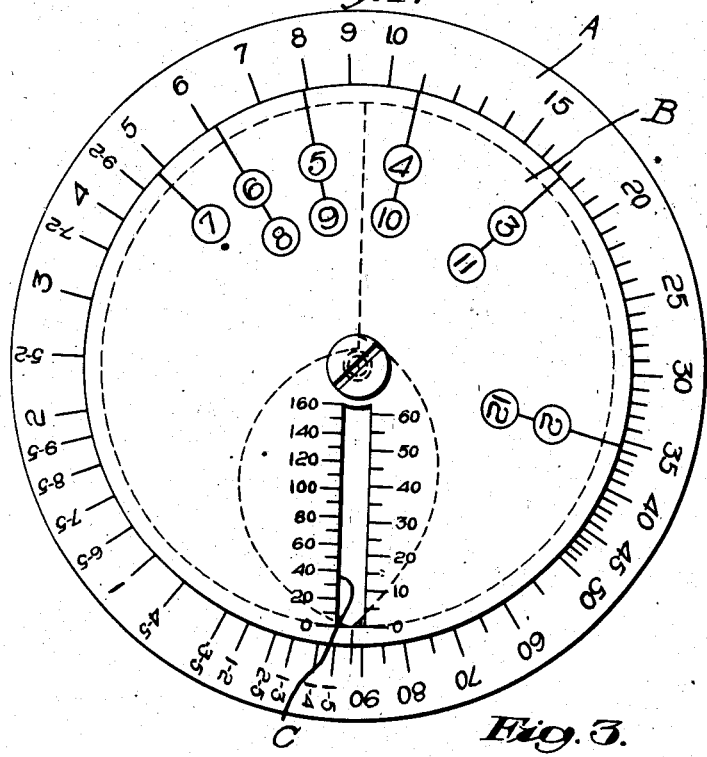
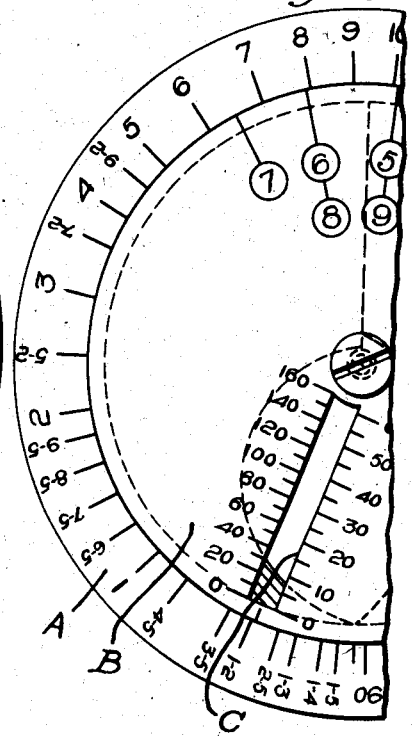
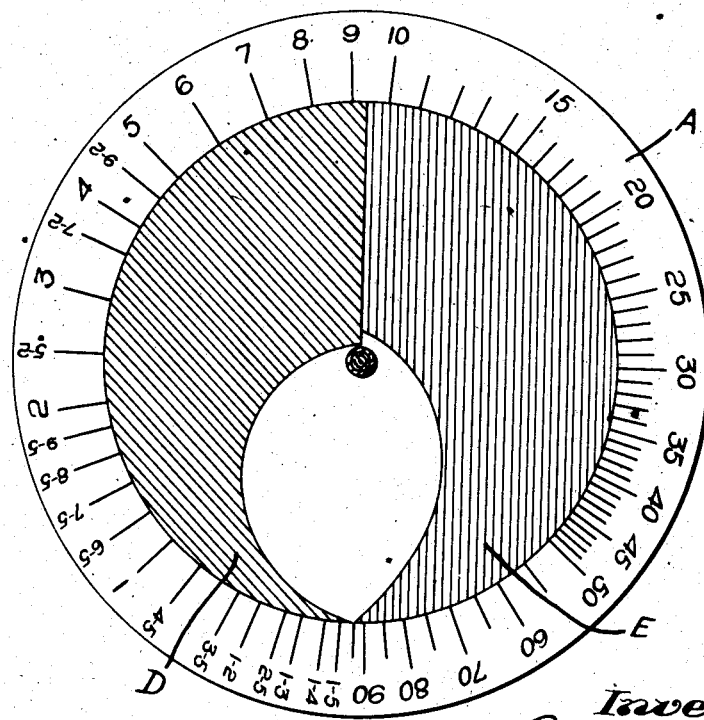
Inventor
Arthur F. Pym
by Kenway & Witter
Attorneys Jan. 15, 1946. A. F. PYM 2,392,877
CALCULATING OR INDICATING DEVICE
Filed Sept. 30, 1939   3 Sheets-Sheet 2

Inventor
Arthur F. Pym.
by Kenway & Witter
Attorneys

Jan. 15, 1946.   A. F. PYM   2,392,877
CALCULATING OR INDICATING DEVICE
Filed Sept. 30, 1939   3 Sheets—Sheet 3

Inventor:
Arthur F. Pym
by Kenway & Witter
Attorneys

Patented Jan. 15, 1946

2,392,877

UNITED STATES PATENT OFFICE 2,392,877

CALCULATING OR INDICATING DEVICE

Arthur F. Pym, Beach Bluff, Mass.; George H. Heys, Swampscott, Mass., administrator of Arthur F. Pym, deceased Application September 30, 1939, Serial No. 297,327

7 Claims. (Cl. 235—70)

This invention consists broadly in a calculating or indicating device by the use of which the user is enabled to establish the advantages or disadvantages of a prospective venture by relating the estimated expectancy of an event occurring with the reward if the event does occur. This is a measure of the probability of an event occurring against the ratio between the cost and the possible return and indicates to the user the advantages or disadvantages to him if he enters into the venture under consideration, or a number of similar ventures which he is free to select of his own volition.

An important field of use for the present invention is in connection with race track wagering where the probability of a selected horse winning the race and the pay-off are the important factors to be considered by the better in deciding whether or not to make the particular venture.

The object of my invention is to provide an indicating device by which the user can readily, conveniently and mechanically ascertain the relative merit of a prospective wager as measured by the relation between the estimated expectancy of an event occurring and the reward if the event does occur.

For purposes of illustration the calculating device of my invention will be discussed in its adaptation to race track betting although it will be understood that it may be employed with equal advantage in any game of chance whether designed to improve the breed of horses or for purposes of general amusement. For the sake of simplicity the following discussion will be confined to the so-called "pari-mutuel" system of wagering although most of the discussion applies equally well to systems where bookmakers handle the wagers.

The calculator of my invention is designed to deal with three different items:

1. The probability of the event occurring.
2. The ratio between the cost and the return, that is to say, the pay-off odds.
3. The advantages and disadvantages to the venturer if the transaction under discussion is entered into; in other words the profit and loss.

In this discussion it will be considered that the venturer is interested in the event occurring, and more particularly that it will profit the venturer if the event occurs provided he enters the transaction. That is, in brief, he is wagering that an event will occur against others who are wagering that the event will not occur. The standard procedure is for the track to wager that a horse will not win and for the better to wager that the horse will win. Thus we are primarily concerned with the probability of the selected horse not winning and this, of course, is readily derived from the probabilities that he will win the race. Thus if a horse has 1 chance in 16 of winning, that probability is represented by odds of 15 to 1. This means that the probability of not winning is 15/16. In the following discussion we shall refer to these odds, 15 to 1 in the illustrative case, as the "A" odds. In this case $A=15$.

The probability of a selected horse winning a particular race depends upon a number of factors, which by those skilled in the study of such matters may be estimated with intelligence and a certain degree of accuracy. Among these factors are the following:

1. The horse itself—its breeding, etc.
2. The opposition both in quantity and quality.
3. The condition of the horse.
4. The distance to be run.
5. The track condition.
6. The jockey.
7. Racing luck; break at post, etc.
8. The desire of the owner of the horse to win the particular race.
9. The weight to be carried.

Selectors, and those offering information and advice to betters, carefully acquaint themselves with all the facts concerning a particular horse, especially its past history and performances, recent workouts, and present conditions and after careful analysis of all factors, arrive at a fairly approximate idea of the horse's chance of winning any particular race. This chance of the horse winning the race may be expressed in terms of $$\frac{1}{A+1}$$

where A represents an A to 1 odds of probability of the horse in winning. It is necessary first in order for the better to make an intelligent bet, that he should have before him as close and as accurate information as to each horse's actual chance to win the race as determined by consideration of every known factor affecting the particular horse and the race in which it is to start.

The second essential factor is the pay-off odds which we will refer to hereinafter as the "B" odds. In pari-mutuel tracks the pay-off for the winning horse is entirely dependent on the distribution of the betting, minus the track and government or other miscellaneous deductions or rake-offs and minus the breakage, i. e. paying to the nearest nickel or dime per dollar paid.

As the betting progresses for any particular horse, most tracks keep the audience familiar in so far as possible with the distribution of the bets, and also compile an approximation of the odds that results from such distribution of the betting. These odds, the B odds, vary as the betting continues, up to the start of the race or the conclusion of the betting. An error in estimating the odds as given by the track as being the final B odds is not in most cases great enough to affect materially any calculations based on them.

The profit and loss on wagering transactions may be measured if we assume that the venturer engages in a sufficient number of transactions of identical kind so that the general law of averages will cause the event to occur a number of times with the given probability of the event occurring. The profit or loss would then be the difference between his total return as measured against the capital necessary to undertake the venture. More specifically, the venturer's profit and loss is his percentage increase or decrease in capital measured against the capital used in undertaking the ventures. The bet that gives the better the highest probability of winning is not necessarily the best bet. The best bet is that which shows the best mathematical profit measured in percentage, or in other words, the highest ratio of possibility of return as compared to the risk undertaken. Mathematically expressed the percentage of profit or loss is $$\frac{B-A}{A+1}(100)$$

where A is the odds of the horse not winning as measured against the unit 1 of the horse winning, and where B is the odds posted at the track, i. e., the payment for each dollar bet, excluding the return of the dollar bet. For example where A=11 making the odds 11:1, and B=8 the posted odds, the formula is solved as follows:

$$\frac{8-11}{11+1} = -\tfrac{1}{4} \text{ or } -25\%$$

From a study of the formula $$\frac{B-A}{A+1}(100) = \text{percentage profit}$$

it will be seen that profitable betting is dependent on accurate information concerning both A and B odds and that advantageous wagering is indicated by the formula. Many bets are based entirely on the A odds, or the horse's chance of winning, the better seeking from all sources, including his own intuition, to determine which horse has the best chance of winning, and then betting accordingly regardless of the pay-off consideration. Even though the better may carefully weigh each horse's chances of winning, he will find his work of small value unless due consideration is given to the B or pay-off odds in accordance with the formula above stated. The horse with the best chance of winning may be the poorest bet, while the horse with the poorest chance of winning may be the best bet dependent upon the distribution of the wagers on the particular race in question.

The calculating device of my invention represents a solution of the problem of how to arrange the values for A and B in such a manner that with little manual manipulation which may be effected mechanically and accurately even under the stress of race track conditions, the value of the expression $$\frac{B-A}{A+1}$$

can be readily determined and expressed in percentage as applied to any horse starting in a given race.

It will be apparent that the calculator must include at least three scales or series of indicators, one each for values of A and B and a third for the percentage values, in addition to an index or marker for the percentage scale. The A and B values are not expressed in percentages and therefore there must be a third or percentage scale which has a definite relation to the A and B scales. For example, any given linear distance on the A scale, no matter where taken, must correspond to a fixed percentage value as indicated by the percentage scale. This I have accomplished by calculating a series of sufficient terms to cover the range of odds under investigation so that the different values for the terms of the series are a fixed percentage greater than the next term as controlled by the basic formula. A suitable series can be calculated from the expression $$\frac{B-A}{A+1}(100) = K$$

where K is a constant, and solving for B when A is equal to the next lower term of the series. For example, assuming that K=20% and A=1, a typical series would then be worked out as follows:

(1)
$$\frac{B_1-A}{A+1} = .20$$

$$\frac{B_1-1}{2} = .20$$

$$B_1 = 1.40$$
2nd term = 1.40

Having found $B_1$ to be 1.40, $B_2$ is calculated as follows:

(2)
$$\frac{B_2-B_1}{B_1+1} = .20$$

$$\frac{B_2-1.40}{1.40+1} = .20$$

$$B_2 = 1.88$$
3rd term = 1.88

Again, having found $B_2$ to be 1.88, $B_3$ is calculated as follows:

(3)
$$\frac{B_3-B_2}{B_2+1} = K = .20$$

$$\frac{B_3-1.88}{1.88+1} = .20$$

$$B_3 = 2.456$$
4th term = 2.456

The complete series can be calculated from the generalization of the basic formula $$\frac{A_n - A_{n-1}}{A_{n-1}+1} = K$$

Where $n$ indicates any term in the series.

However, this cannot be done very conveniently as it necessitates starting with some given value for $A_1$, calculating $A_2$, then after $A_2$ is determined placing its value in the general formula and solving for $A_3$, then after $A_3$ is determined placing its value in the general formula and solving for $A_4$, etc. This means that if we wanted to find the tenth term of the series, we would have to calculate the preceding terms which would be very arduous and cumbersome. Furthermore, when the value for K is a fraction, the number of places that each term must be carried out to, increases as the number of terms increase. This further increases the unwieldiness of the numbers. If approximations of the last figures are taken, then the errors become cumulative and you can never be sure of the final results.

The next step, therefore, is to determine an expression that will readily give any term of a series that is represented by $$\frac{A_n - A_{n-1}}{A_{n-1} + 1} = K$$

This expression may be determined as follows: Let $A_1, A_2, A_3, A_4, A_5 \ldots A_n$ represent terms of the series then:

1st term: $A_1$ (definition)

2nd term: $A_2 = A_1 + K(A_1 + 1)$ which is derived as follows:

Substituting in the general formula we have $$\frac{A_2 - A_1}{A_1 + 1} = K$$

Transposing $A_2 = A_1 + K(A_1 + 1)$

3rd term: $A_3 = A_1 + K(A_1 + 1) + (K+1)K(A_1+1)$ which is derived as follows:

Substituting in the general formula we have $$\frac{A_3 - A_2}{A_2 + 1} = K$$

Transposing $A_3 = A_2 + K(A_2 + 1)$

Substituting $A_1 + K(A_1 + 1)$ for $A_2$ we find that $$A_3 = A_1 + K(A_1 + 1) + (K+1)K(A_1 + 1)$$

4th term: $A_4 = A_1 + K(A_1 + 1) + (K+1)K(A_1+1) + K(A_1+1)(K+1)^2$

Substituting in the general formula we have $$\frac{A_4 - A_3}{A_3 + 1} = K$$

Transposing $A_4 = A_3 + K(A_3 + 1)$

Substituting the previously found value for $A_3$ in this expression and factoring, we evolve the above expression for the fourth term.

Likewise, the fifth term can be found, and so can all the rest of the terms. Nevertheless, these expressions for the various terms of the series are not any more convenient to use than going to the trouble of calculating each term before arriving at the value for the desired term.

The problem is to find a general expression for any term $(t_n)$ that involves easily determinable numbers.

If we subtract the first term from the second term, the difference is $K(A_1 + 1)$ which can be indicated by $d$. Also, if one is added to $K$ it would still be constant. Thus, $K+1 = r$ by definition.

Substituting $d$ and $r$ for their equivalent expressions in the values for the terms of the series, the following ensues:

1st term $= A_1$
2nd term $= A_1 + d$
3rd term $= A_1 + d + rd$
4th term $= A_1 + d + rd + r^2 d$
5th term $= A_1 + d + rd + r^2 d + r^3 d$
Nth term $= A_1 + d + rd + r^2 d + r^3 d \ldots r^{n-2} d$ From the above expression for the Nth term, it can be seen that it is equivalent to the first term of the series plus a geometric progression starting with $d$ and ending with $r^{n-2} d$. The sum of the progression can be expressed by $$d\left(\frac{r^{n-1} - 1}{r - 1}\right)$$

Therefore, the equation for any term is as follows:

$$t_n = A_1 + d\left(\frac{r^{n-1} - 1}{r - 1}\right)$$

Assume it was desirable to know the fourth term of the previous series for which sample calculations were given. This would now be accomplished as follows:

$$t_n = A_1 + d\left(\frac{r^{n-1} - 1}{r - 1}\right)$$

given: $A = 1$, $d = K(A_1 + 1)$ (definition)
$K = .20$, $r = K + 1$ (definition)

Required the fourth term: $n = 4$ $$t_n = A_1 + d\left(\frac{r^{n-1} - 1}{r - 1}\right)$$

$$= 1 + .40\left(\frac{1.20^3 - 1}{.20}\right)$$

$$t_n = 2.456$$

Being able to calculate any term in the series does not solve all the problems, as it may be desirable to know exactly which term or portion of a term a certain value is. This can readily be calculated, however, by transposing the above equation so that it will give a value for N.

Assume it was desired to find what term of the series the number 2 was. This might be done as follows:

$$t_n = A_1 + d\left(\frac{r^{n-1} - 1}{r - 1}\right)$$

where $t_n = 2$; $A_1 = 1$; $r = 1.20$ and $d = 0.40$ $$r^{n-1} = \frac{(t_n - A_1)(r-1)}{d} + 1$$

$$n = \log\left[\frac{\frac{(t_n - A_1)(r-1)}{d} + 1}{\log r}\right] + 1$$

$$n = \frac{\log 1.5}{\log 1.20} + 1$$

$$= \frac{.17609}{.07918} + 1$$

$$n = 3.22$$

Thus 2 is the 3.22 term.

This agrees with the previous example in which it was evident that the figure 2 was somewhere between the third and fourth term of the series.

Since a series or any term of the series that agrees with the basic formula $$\frac{A_n - A_{n-1}}{A_{n-1} + 1} = K$$

can be determined, the only problem remaining is to graphically arrange these values so that when the scales are moved relative to each other, it will be possible to readily determine the percentages change. This is done as follows:

By definition, it was decided that each term of the series would have a definite relationship to each other in accordance with the basic formula $$\frac{A_n - A_{n-1}}{A_{n-1} + 1} = K$$

The answer (K) is expressed in the percentage when multiplied by one hundred. If the series is now laid out graphically and each term is so arranged on such a scale that the various terms of the series are unit distances apart, then it follows, at least for these unit distances, that any unit distance between terms is a fixed percentage as determined by the general formula, no matter where it is on the scale.

The next step is to show that any linear distance, no matter where it is taken on the scale, will give a constant percentage reading if the relationship between the terms is determined by the general formula. This may be done as follows:

We want to prove that any two terms of the series that are a fixed number of terms away from each other, give the same result when placed in the formula $$\frac{B-A}{A+1}=K$$

as any other set of terms that are the same fixed distance away from each other.

Let $t_n$ and $t_x$ represent any two terms in the series. A corresponding set of terms that has the same difference between terms is $t_{n-y}$ and $t_{x-y}$, where $y$ is any given number of terms. It is therefore necessary to prove that the following expressions are equal to each other.

$$\frac{t_n-t_x}{t_x+1}=K=\frac{t_{n-y}-t_{x-y}}{t_{x-y}+1}$$

$$t_n=A_1+\frac{d}{r-1}(r^{n-1}-1)$$

$$t_x=A_1+\frac{d}{r-1}(r^{x-1}-1)$$

$$t_{n-y}=A_1+\frac{d}{r-1}(r^{n-y-1}-1)$$

$$t_{x-y}=A_1+\frac{d}{r-1}(r^{x-y-1}-1)$$

Substituting these values in the above expression the following ensues:

$$\frac{A_1+\left(\frac{d}{r-1}\right)(r^{n-1}-1)-A_1-\left(\frac{d}{r-1}\right)(r^{x-1}-1)}{A_1+\left(\frac{d}{r-1}\right)(r^{x-1}-1)+1}=$$

$$\frac{A_1+\left(\frac{d}{r-1}\right)(r^{n-y-1}-1)-A_1-\left(\frac{d}{r-1}\right)(r^{x-y-1}-1)}{A_1+\left(\frac{d}{r-1}\right)(r^{x-y-1}-1)+1}$$

These expressions readily reduce to the following:

$$\frac{r^{n-1}-r^{x-1}}{A_1+\left(\frac{d}{r-1}\right)(r^{x-1}-1)+1}=\frac{r^{n-y-1}-r^{x-y-1}}{A_1+\left(\frac{d}{r-1}\right)(r^{x-y-1}-1)+1}$$

As $$r^{n-y-1}-r^{x-y-1}=r^{-y}(r^{n-1}-r^{x-1})$$

Then $$\frac{1}{A_1+\left(\frac{d}{r-1}\right)(r^{x-1}-1)+1}=\frac{r^{-y}}{A_1+\left(\frac{d}{r-1}\right)(r^{x-y-1}-1)+1}$$

or $$A_1+\left(\frac{d}{r-1}\right)(r^{x-1}-1)+1=$$

$$r^y\left[A_1+\left(\frac{d}{r-1}\right)(r^{x-y-1}-1)+1\right]$$

$$A_1+\left(\frac{d}{r-1}\right)r^{x-1}-\frac{d}{r-1}+1=$$

$$A_1r^y+\left(\frac{d}{r-1}\right)r^{x-1}-\left(\frac{d}{r-1}\right)r^y+r^y$$

$$(A_1+1)(1-r^y)=(1-r^y)\left(\frac{d}{r-1}\right)$$

$$A_1+1=\frac{d}{r-1}$$

Since $$d=K(A_1+1), r=K+1$$

Then:

$$A_1+1=\frac{K(A_1+1)}{K+1-1}$$

$$1=1$$

Which means that the original expressions are equal to each other.

Thus, we have proved that any unit distance moved on the scale will result in the same percentage increase of the initial term in accordance with the general formula. It makes no difference what part of the scale is used or with which term you start with initially.

The only problem now remaining is to determine the percentage scale.

Since any portion of the A or B scales gives the same percentage reading, the formula for the percentage scale can be determined directly from the terms of the series.

The following is the derivation of the percentage formula:

First, determine the value for K by use of the general formula $$\frac{B-A}{A+1}=K$$

between various terms of the series and the first term. This is readily done by substituting the various terms of the series into the general formula and finding their relationship to the first term, $K$, $K_1$ and $K_2$ being successive points on the percentage scale.

For example, the terms of the series are:

1st term $=A_1$
2nd term $=A_1+d$
3rd term $=A_1+d+dr$
4th term $=A_1+d+dr+dr^2$
5th term $=A_1+D+dr+dr^2+dr^3$ Substituting these terms in the general formula and solving for K the following results:

$$K_1=K_1$$

Substituting in the general formula:

$$\frac{A_2-A_1}{A_1+1}=K$$

$$\frac{A_1+d-A_1}{A_1+1}=K$$

but $d=K_1(A_1+1)$
thus $$K_1\left(\frac{A_1+1}{A_1+1}\right)=K$$

$$\therefore K_1=K$$

$$K_2=K_1+K_1r$$

Substituting in the general formula:

$$K_2=\frac{A_3-A_1}{A_1+1}$$

$$K_2=\frac{A_1+d+dr-A_1}{A_1+1}$$

$$K_2=\frac{d(1+r)}{A_1+1}$$

but $d=K_1(A_1+1)$
thus $$K_2=K_1+K_1r$$
$$K_3=K_1+K_1r+K_1r^2$$
$$K_4=K_1+K_1r+K_1r^2+K_1r^3$$
$$K_5=K_1+K_1r+K_1r^2+K_1r^3+K_1r^4$$

therefore:

$$Kn = K_1 + K_1r + K_1r^2 + K_1r^3 \ldots K_1r^{n-1}$$

This is the expression for a regular geometric series and can be expressed as follows:

$$Kn = \left(\frac{r^n - 1}{r - 1}\right)K$$

but $$K = r - 1$$

Thus $$Kn = r^n - 1$$

where $Kn$ equals any percentage value and $n$ equals the number of the term. To plot the percentage scale all that is necessary is to know $Kn$, solve for $n$ and multiply $(n-1)$ by the unit distance between the terms of the series. It is necessary to multiply the answer by the same unit distances between terms because the percentage scale is dependent on the relative movement of the A and B scales. Therefore the unit distances between terms must be used. The reason 1 must be subtracted from the value of $n$ is that the first term of the series corresponds to the 0 term of the percentage scale.

One desirable construction, embodying my invention in practical and convenient form, consists in an underlying member having thereon a scale indicating progressively increasing odds and a cooperating slide or disk on which specific risks are registered and which is transparent so that a percentage scale, or other scale, on the underlying member may be read directly by reference to an indicator carried by the superposed transparent member.

Another desirable construction consists in the combination with a common underlying member having progressively increasing odds indicated thereon and also a percentage indicating scale or curve, of an assortment of interchangeable superposable slides or disks which may be selectively assembled or used with the underlying member. Each slide or disk may have registered thereon a different series of selected risks. For example, each of them may have registered thereon the different horses scheduled to start in the successive races of a given day and each disk or slide may be used and discarded by the better as the respective races are run off.

Figure 4:
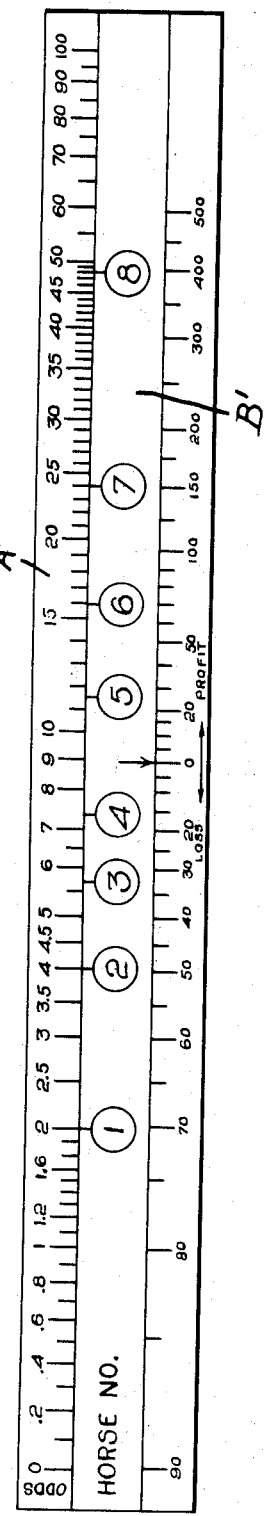

It will be apparent that the calculator of my invention may take divers mechanical forms. For purpose of illustration and in order to facilitate an understanding of the invention four preferred embodiments thereof have been selected, and are illustrated in the accompanying drawings, in which:

Fig. 1 is a plan view of a calculator in circular form at initial setting,

Fig. 2 is a corresponding view showing the calculator adjusted in accordance with the pay-off odds and the established expectancy of a specific horse in a given race, Fig. 3 is a view of the calculator with its overlying disk removed, Fig. 4 is a plan view of a slide rule type of calculator in position at initial setting, and Fig. 5 is a similar view showing the calculator set to indicate the resulting disadvantage or minus percentage for a particular pay-off price and estimated chances in a hundred.

Figure 6:
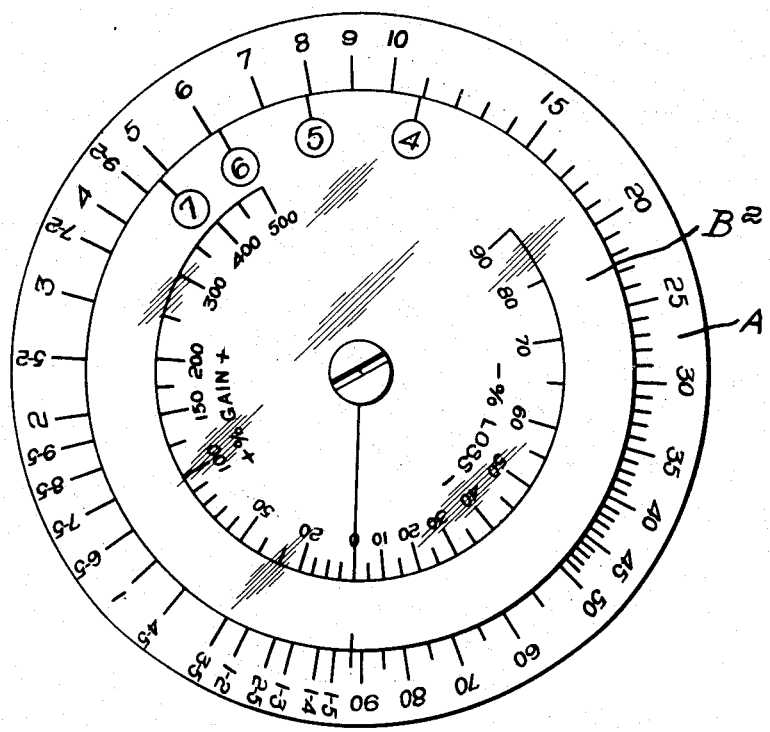
Figure 7:
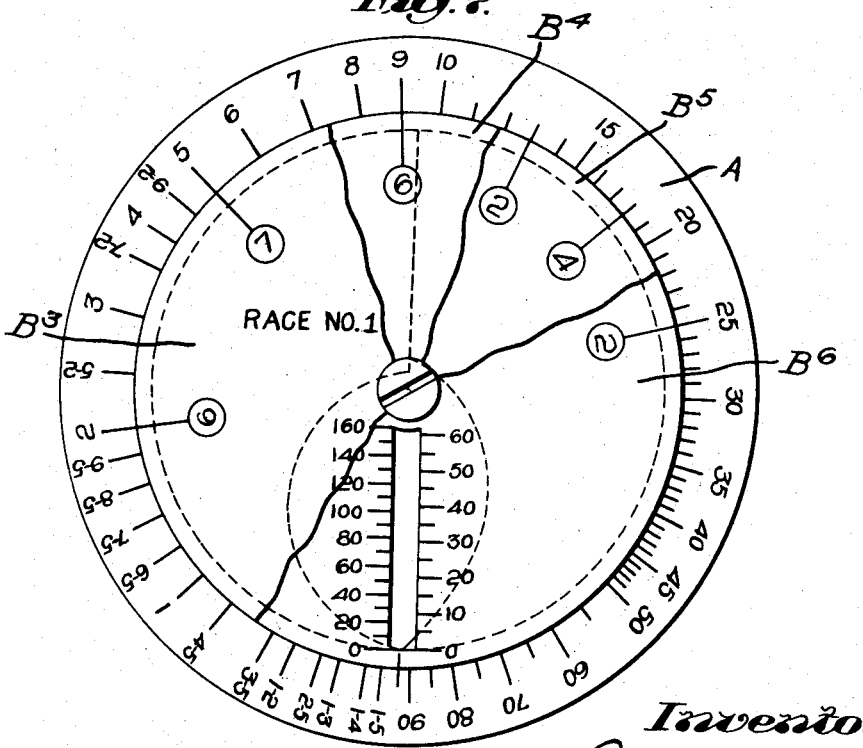

Fig. 6 is a plan view of a calculator in circular form having one transparent member, and Fig. 7 is a plan view of a calculator having an assortment of individual disks, one for each race of a series.

In the accompanying drawings I have illustrated four different embodiments of my invention in the form of calculating or indicating devices adapted particularly for convenient race track use. The essential elements of all these devices are two relatively movable members having properly arranged thereon:

(1) A series of symbols representing various pay-off odds, (2) A number of indices or pointers registering particular horses in a particular race. For convenience these indices will be referred to as horse pointers.

(3) A series of symbols representing various advantages or disadvantages, which will be referred to as the percentage scale.

(4) An indicator cooperating with the percentage scale to designate advantages and disadvantages.

These four elements in the calculating device may have the following relationship to each other:

(a) The elements of the pay-off scale and the horse pointers are movable relative to each other so that any horse pointer may be definitely related to any pay-off scale indication, (b) The elements of the percentage scale and indicator are movable relative to each other so that any advantage or disadvantage symbol may be definitely related to the indicator.

(c) In the movement of relating any selected horse pointer to any definite pay-off symbol there occurs a simultaneous movement of the indicator relative to the percentage scale.

(d) The resulting movement of the indicator brings about an indication on the percentage scale of the merits of the prospective wagers in terms of the percentage scale depending upon the previously estimated expectancy of the horse winning the race.

Taking the calculating device illustrated in Figs. 1-3 as one example of a device embodying my invention, it will be seen that the two relatively movable members comprise the concentric disks A and B connected by a central pivot for relative rotary movement, the large and underlying disk A in this specific instance carrying a circular scale representing various pay-off odds, these being herein shown as graduated from 1-5 to 90. The odds are indicated 1-5, 1-4, 1-3, 2-5, 1, 2, 3, 7-2 etc., and are laid out in accordance with the previously described relationship.

The smaller and superposed disk B has registered thereon the various horses which are expected to start in the particular race for which the device is intended to be used. That is, it carries the horse pointers which are arranged in positions corresponding to the odds as determined by the selector or user in terms of the pay-off scale on the underlying disk A. For example, in Fig. 1, horse No. 5 and horse No. 9 are rated at slightly less than 8-1, while horses Nos. 3 and 11 are both better than 17-1 shots. The disk B is provided with a radial window or slot C having a percentage scale indicated upon each edge. These scales, it will be observed, are dissimilar in their graduations, the scale on the left hand side of the slot running from 0 to 160 and the scale on the right hand edge of the slot running from 0 to 60. These scales are arbitrarily selected and laid out at the discretion of the maker. In the first instance they happened to be two different linear scales but they do not have to be.

In the illustrated device the percentage indicator takes the form of two curves which are progressively uncovered by movement of the superposed disk B in either direction from its initial or 0 percentage position as shown in Fig. 1. In Fig. 3 the left hand half of the disk A is shown as provided with a green area bounded by a carefully calculated curve starting at the 0 point of the pay-off scale and approaching the center of the disk in accordance with the equation $$\frac{B-A}{A+1}=K$$

K is a constant arbitrarily selected to bring the curve within the bounds of the available area, or so that its polar dimensions shall not exceed the length of the slot C. On the right hand side of the disk A is a red area bounded in part by a curve starting in the neighborhood of the 1-5 point of the pay-off scale and rising similarly toward the center of the disk in curves with a similar equation. The relationship of these curves to the pay-off scale satisfies the condition that equal movement of the disk B with reference to any part of the pay-off scale will result in equal percentage indication on the percentage scales. The curves are plotted by polar coordinates with the center of the disk as origin. They are not symmetrical and they may or may not be similar, depending upon the layout of the percentage scales.

The red and green curves are controlled by two factors (a) the size of the scale selected for laying out a given percentage for the A and B circular scales and (b) the arbitrary percentage scales alongside the sight slot C. The size of the A and B scales determines the angular distance that the slot must be rotated to establish a given percentage. In other words a radial line is established for a given percentage. The arbitrary percentage scale alongside the aperture establishes the point along this radial line that goes to and comprises the red or green curve.

The horse marks on the B scale indicate the handicapper's estimate of the chances of winning of the individual horse. These estimated chances are converted to the corresponding odds in the A and B scales. For example, starting with a horse that has 50 chances in 100 of winning, the corresponding handicapper's odds for the B scale would be 1 to 1 when the B disc is in its zero position. If this horse were to pay 2 to 1, the percentage in favor of the better in accordance with the basic formula would be $$\frac{2-1}{1+1}$$

or 50%. To find the corresponding point on the green curve, rotate the B scale until the horse mark is opposite the 2 to 1 odds. Now a point may be made on the bottom disc directly opposite to the 50% index mark on the green percentage scale at the edge of the slot. This is one point on the green curve.

To plot a second point on the green curve, the horse mark may be moved to the 3 to 1 position. According to the basic formula $$\frac{3-1}{1+1}$$

or 100% would be the advantage to the better. Now a mark may be placed on the bottom disc directly opposite the 100% index mark on the green percentage scale. This is a second point on the green curve.

In a similar manner any number of intermediate points may be calculated and plotted. Likewise the red curve can be calculated and plotted by rotating the B disc in the opposite direction.

The use of the device is exemplified by comparing the position of the disk B as shown in Figs. 1 and 2. For example, in Fig. 1 horse No. 7 is registered opposite pay-off odds of slightly less than 5-1. At the start of the race, however, the posted odds on horse No. 7 are 6½-1. Accordingly the user rotates the disk B until the horse pointer No. 7 indicates 6½ on the pay-off scale. This movement of the disk B carries the slot C over the green area D and the limiting curve of this green area indicates upon the left hand percentage scale that the wager made on horse No. 7 under these conditions shows the better a mathematical expectation of 30% profit as a result of that particular venture. If the posted odds on horse No. 7 had dropped to 4-1 for example, a corresponding setting of the disk B would have uncovered a portion of the red area E and would have indicated a small disadvantage in respect to the particular venture under investigation.

In Figs. 4 and 5 my invention is shown as embodied in a calculating device of the slide rule type in which the pay-off odds are indicated upon one side of the body of the rule A' and the percentage scales are indicated upon the other side of the body of the rule reading in both directions from a 0 point. The horse pointers are registered upon the movable slide B', numbers 1 to 8 being shown in Fig. 4 and the slide B' also carries an arrow indicating the 0 setting of the slide. In Fig. 5 the slide B' is shown as having been displaced toward the left. In an investigation of the advantage or disadvantage of betting upon horse No. 2 in Fig. 4 the pay-off scale indicates that horse No. 2 was rated by the selector as 4-1. However at the start of the race the posted odds on horse No. 2 were 2-1. Accordingly, the scale B' has been displaced toward the left to register the No. 2 horse pointer with the 2-1 graduation mark in the pay-off scale. Simultaneously the arrow indicator has been moved to indicate a disadvantage of 40% in the venture under discussion.

The device illustrated in Fig. 6 is similar to that shown in Figs. 1-3 except that in this instance the superposed disk $B^2$ is transparent and the percentage scales which are placed upon the underlying disk A are therefore visible through the horse pointer disk $B^2$. A pointer or index line is inscribed on the upper disk. Movement of the disk $B^2$ in relation to the lower disk A will cause the pointer to move relative to the percentage scale. The correct percentage reading is indicated by the pointer.

The device illustrated in Fig. 7 is similar to that of Figs. 1-3 except that instead of being provided with a single horse pointer disk it is provided with an assortment of disks $B^3$, $B^4$, $B^5$, and $B^6$ all similar in their construction, but each carrying the horse pointers for a single race in one day's racing. The uppermost disk is marked race No. 1 and is shown registering horse No. 6 at 2-1 odds and horse No. 7 at 5-1 odds. This disk may be used for the No. 1 race and then torn up exposing disk $B^4$ which is marked for the No. 2 race and which in Fig. 7 shows horse No. 6 registered at 9-1 odds. When race No. 2 has been run disk $B^4$ may be torn off exposing disk $B^5$ for race No. 3, and so on. The disks of the assortment are, of course, compiled and printed from information secured by the selector and may be supplied to the user before the opening race. Each disk $B^3$, $B^4$, etc., is provided with a radial slot graduated along its edges in percentage scales reading on both sides from the zero point as described in connection with the device of Figs. 1 and 2.

Having thus disclosed my invention and described in detail certain embodiments thereof, I claim as new and desire to secure by Letters Patent:

1. A calculating device of the character described, comprising connected and relatively movable members, one graduated in a scale indicating progressively increasing odds and the other marked to indicate specific risks in terms of said scale when the two members occupy a predetermined initial position; percentage scales and a cooperating percentage indicator carried respectively by one and the other of said relatively movable members, said percentage scales being laid out separately from a common zero point corresponding to the predetermined initial position of said members and registering varying percentages as said members are moved relatively to each other for the purpose of showing the best possibility of return as compared to the risk indicated by the setting of said members.

2. A calculating device of the character described, comprising connected and relatively movable members, one having symbols representing various pay-off odds laid off quantitatively on a linear scale from a predetermined zero point, the other having indicating marks representing specific wager-risks of various horses, one of said members having two percentage scales laid out separately from a common zero point coinciding substantially with the common zero point of the odds scale, and the other member having a cooperating indicator for said percentage scales which registers varying percentages as the members are moved relatively to each other for the purpose of showing the best possibility of return as compared to the risk indicated by the setting of said members.

3. A calculating device of the character described, comprising relatively movable members, one graduated in a scale indicating progressively increasing odds and the other upon which are indicated specific risks in terms of said scale when the two members are in a predetermined initial position, one of said members having an elongated window arranged to expose either one of two oppositely arranged percentage curves both located upon the other member and viewable through the said window as the members are relatively moved out of their initial position to register changes in the odds affecting any selected risk, the said curves being so located as to intersect one or other of the percentage scales when the two members are so relatively moved.

4. A calculating device comprising a member carrying a fixed scale graduated to indicate various pay-off odds, a relatively movable member carrying a scale marked to indicate permanently, when in a predetermined initial position, specific risks in terms of said fixed scale and having an elongated radial slot therein graduated with a percentage scale, and an oppositely disposed curve located beneath the movable scale on said fixed scale member, being viewable through said slot and arranged to be progressively uncovered and to intersect the said scale as the scale-carrying member is moved in either direction from its initial position to register on said scale changes in the odds affecting the specific risks indicated thereon.

5. A calculating device of the class described, comprising relatively movable members one underlying and being overlapped by the other and having a linear scale indicating various pay-off odds in terms, A, and the other marked to indicate specific risks in terms, B, of said scale when the members occupy a predetermined initial position, the graduations and marking of said two members being made in accordance with the equation $$\frac{B-A}{A+1}=K$$

when B is the posted odds and K is a constant, percentage scales on the overlying member, and percentage curves located on said underlying member and arranged to be exposed and made progressively viewable by relative movement of said members, the said curves being so shaped that the same linear distance anywhere on the scale of the said members corresponds to a fixed percentage value as indicated by the percentage scales, said overlying member having an edge movable over the percentage curves.

6. A calculator of the class described, consisting of two circular discs pivoted at their centers, one of the discs graduated in a circular marginal scale to represent various pay-off odds and having two distinctive areas bounded in part by curves concave in opposite directions and extending inwardly from a common point adjacent to the scale of odds; the other disc containing various indicators designating horses in a particular race in terms of the said scale, said indicators being so arranged that by rotating either disc about their common centers, any pay-off odds may be related to any horse indicator, the latter disk having also a window with spaced edges cooperating with curves defining said distinctive areas and graduated in dissimilar percentage scales.

7. A calculating device of the character described, consisting of two connected and relatively moveable members, one graduated to indicate specific wager risks, and one of which has two different and distinct areas contrastingly colored, the boundary lines of said areas by their shape cooperating to indicate various advantages and disadvantages of a wager when brought into different odds-indicating relation with the other member, and the other member having a wide radial slit graduated upon opposite sides in percentage scales indicating in cooperation with said colored areas the said advantages and disadvantages and having a common zero point and arranged to intersect the boundary line of one or the other of said colored areas when the two members are moved to indicate any specific wager risk.

ARTHUR F. PYM.